(12) United States Patent
Goche

(10) Patent No.: US 7,034,426 B2
(45) Date of Patent: Apr. 25, 2006

(54) ELECTRIC MOTOR WINDINGS

(75) Inventor: Gerald Goche, Dunedin, FL (US)

(73) Assignee: Miraculous Motors Corporation, Dunedin, FL (US)

( * ) Notice: Subject to any disclaimer, the term of this patent is extended or adjusted under 35 U.S.C. 154(b) by 0 days.

(21) Appl. No.: 10/602,966

(22) Filed: Jun. 24, 2003

(65) Prior Publication Data
US 2005/0073207 A1 Apr. 7, 2005

(30) Foreign Application Priority Data
Jun. 25, 2002 (FR) .................... 02 07820

(51) Int. Cl.
*H02K 3/00* (2006.01)
(52) U.S. Cl. .................. 310/184; 318/785; 318/795
(58) Field of Classification Search ................ 310/179, 310/180, 184, 198, 210, 68 R, 190, 193; 318/795, 775–779, 782–785, 793, 792
See application file for complete search history.

(56) References Cited
U.S. PATENT DOCUMENTS

| | | | |
|---|---|---|---|
| 1,916,389 A * | 7/1933 | Ross | ............ 318/817 |
| 4,107,583 A * | 8/1978 | Houtman | ............ 318/781 |
| 4,352,051 A | 9/1982 | Johnson | |
| 4,446,416 A | 5/1984 | Wanlass | |
| 4,792,740 A | 12/1988 | Smith | |
| 4,808,868 A | 2/1989 | Roberts | |
| 4,959,573 A * | 9/1990 | Roberts | ............ 310/68 R |
| 5,212,435 A * | 5/1993 | Dutro | ............ 318/785 |

FOREIGN PATENT DOCUMENTS

DE 25 08 374 A1 2/1975

* cited by examiner

*Primary Examiner*—Tran Nguyen
(74) *Attorney, Agent, or Firm*—Ronald E. Smith; Smith & Hopen, P.A.

(57) ABSTRACT

This invention relates to an alternating current electric motor, single phase or multiphase or synchronous generator, with primary windings (main windings) and de-saturation additional windings. Each additional winding is fed through one or more multiple capacitors in opposite phase angle and opposite field directions from each respective main windings. The total cross sections of the wire used on each main and additional winding are of predetermined sizes and preferably follows the approximate ratio of approximately 2/3 for the main winding and approximately 1/3 for the additional winding, and this capacitor value is of a predetermined size. The method of construction is characterized by the two windings being built at one time in a single operation as a single step.

32 Claims, 7 Drawing Sheets

ELECTRIC MOTOR WINDINGS

RELATED FOREIGN APPLICATION the present application claims the benefit of previously filed co-pending French Patent Application Number 0207820000 filed Jun. 25, 2002, now French patent No. 2 841 404, awarded Nov. 19, 2004. That patent is hereby incorporated by reference into this disclosure.

FIELD OF THE INVENTION

The present invention relates to a high efficiency, low input alternating current electric motor, high output synchronous generator and of varied size and varied speed, and to a specific method of construction.

BACKGROUND OF THE INVENTION

It is generally known for single phase alternating current electric motors to be used from a relatively small size, from fractional horse power up to approximately ten horsepower and thereafter three phase motors are generally used up to very large applications.

In U.S. Pat. No. 4,446,416A to Cravens L. Wanlass, granted May 1, 1984, entitled "Polyphase Electric Machine Having Controlled Magnetic Flux Density" being either a motor or a generator, there is provided a stator core having main windings and additional control windings. The flux density is optimized in a polyphase machine by controlling the flux density in the stator core.

A main polyphase stator winding is wound on a magnetic core, the winding comprising a plurality of windings and each winding represents a single phase. Capacitors are connected with each of the windings in a series circuit.

The present invention is quite distinct and clearly stated in the description.

An additional motor winding technique is also known from the specification of German Patent Application No. 2508374 with a publication date of Sep. 9, 1976 and titled "Single Phase Induction Motor" to Wen, Hung-Ying. This patent application discloses only an induction of a single phase motor with two start windings so as to increase the start capacitor voltage. It also establishes a single phase induction motor with two sets of start windings, with better running power factor and improved starting torque.

SUMMARY OF THE INVENTION

The present invention relates to an alternating current electric machine, and in particular, an alternating current electric motor, which may be provided in the form of a single phase electric motor or a multiphase electric motor with at least three phases including a synchronous generator with at least two poles. The electric motor includes main windings and de-saturation or additional windings in which each additional winding is fed through at least one capacitor. Each additional winding is fed trough at least one capacitor in a different phase angle and opposite field direction relative to the phase angle and field direction of each respective main winding. The total cross section of the wire used on each main and additional winding follows a distinct respective ratio of predetermined value. This ratio is approximately 2/3 for the main winding and 1/3 for the additional winding.

The invention in a preferred form includes a winding process for the alternating current electric motor, in that the two windings of said electric motor are built at one time in one only operation, as a single step.

Conveniently, the present invention includes a formula for calculating the value, in mocrofards, of each additional winding capacitor. The value is directly proportional to full load current and inversely proportional to the square of the line voltage. The value so obtained is multiplied by a constant having a value between $0.25 \times 10^6$ and $0.3 \times 10^6$.

Advantageously, a single phase electric motor, according to the present invention, includes first and second main winding, coupled to a main common point and first and second main potential lines of a line voltage, and first and second additional windings coupled to a capacitor. The first and second potential lines are electrically connected in parallel relation to the first and second main windings. The first and second additional windings generate a field in opposite direction relative to the field of the first and second main windings, respectively.

A start winding is coupled between one of the first and second potential lines, a start capacitor and a switch are coupled between the start capacitor and one of the first and second potential lines.

Each first and second main winding has a first wire size and each of the first and second additional windings has a second wire size. The first wire size is about twice the additional second wire size.

BRIEF DESCRIPTION OF THE DRAWINGS

The invention will now be described, by way of example only, with reference to the accompanying drawings in which.

DESCRIPTION OF THE PREFERRED EMBODIMENTS

In the present invention, the electric motor technology background of known designs is established in FIGS. 1 through 7.

Figure 1:
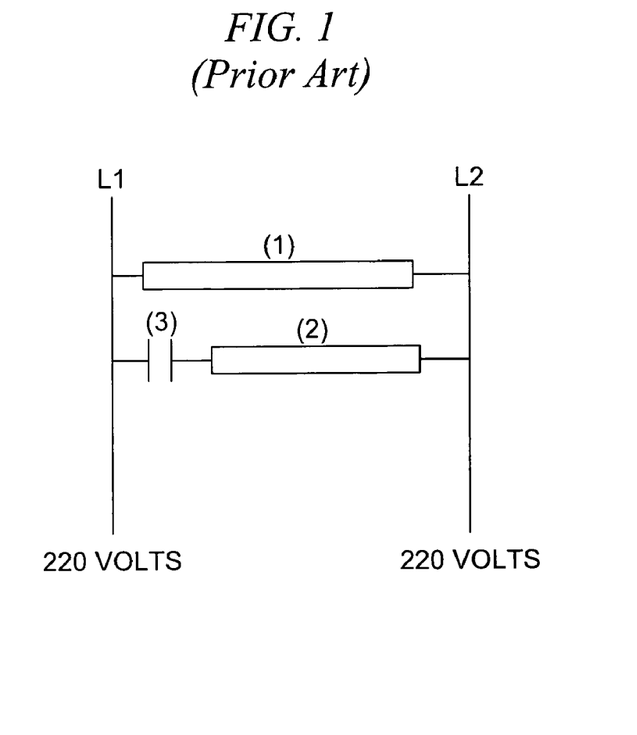
FIG. 1 depicts a known single phase electric motor.

FIG. 1 shows a known single phase motor with a run winding (1), a start winding (2), and a run capacitor (3).

Like reference numerals in the different known designs of FIGS. 1 through 7, as well as those depicted in the inventive features of FIGS. 8 through 11 are used to provide a comparative study between known features and those inventive steps, according to the present invention.

In FIG. 1, the known technology explains the limited efficiency by the saturation level of the wire size that is used for the electric motor construction.

Figure 2:
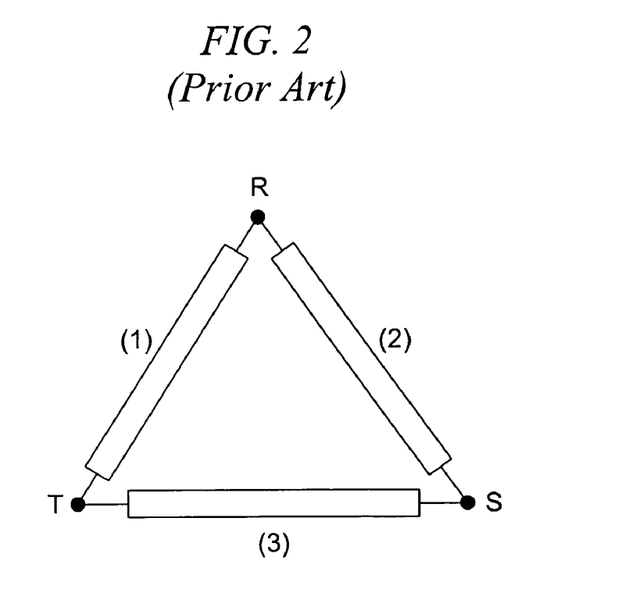
FIG. 2 depicts a known three phase delta configuration motor.
Figure 3:
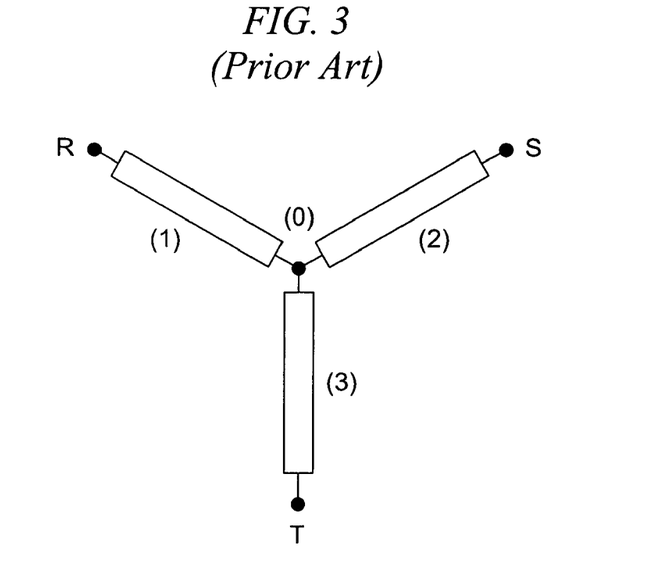
FIG. 3 shows a known three phase delta configuration electric motor.

FIGS. 2 and 3 diagrammatically depict a conventional three phase motor and the windings are indicated by the reference numbers (1), (2), and (3). The incoming line voltage of the three phases is indicated as (R), (S), and (T) and the center point of the star connection is denoted (0).

In known three phase electric motors, the construction uses a specific number of poles, on the basis of required speed, and the star or delta configuration internally connected as required for the purpose of torque, horsepower and voltage.

In both single phase and three phase electric motors, heat losses affected by temperature losses are generally moderated by different standards of commonly available insulation.

It is also known to provide improvements in single phase electric motors by providing a start capacitor in series with a centrifugal switch or a disconnecting relay when added to the start winding circuit. An accurate calculation of the run capacitor sizes in microfarads (μf) optimizes the efficiency of the electric motor by enhancing starting torque, starting current and running temperatures.

Figure 4:
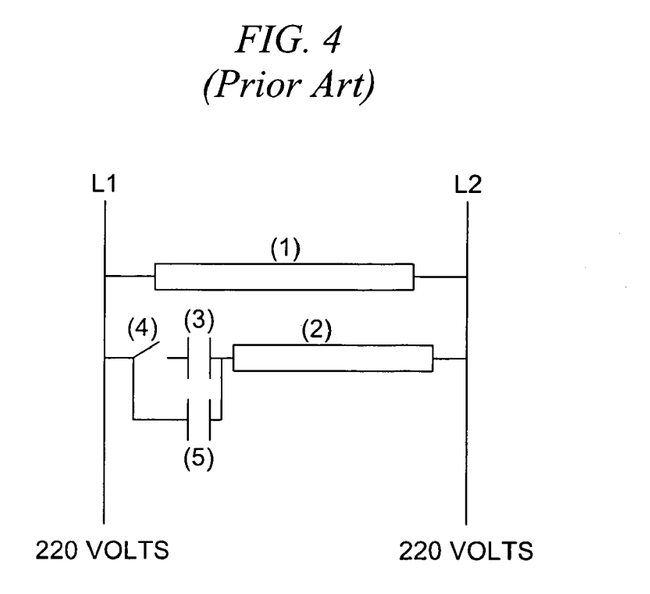
FIG. 4 shows a modified known single phase electric motor.

FIG. 4 is a further design of a single phase electric motor, in which are shown the run winding (1), the start winding (2), the start capacitor (3), the centrifugal switch or disconnecting relay (4) and the run capacitor (5).

Figure 5:
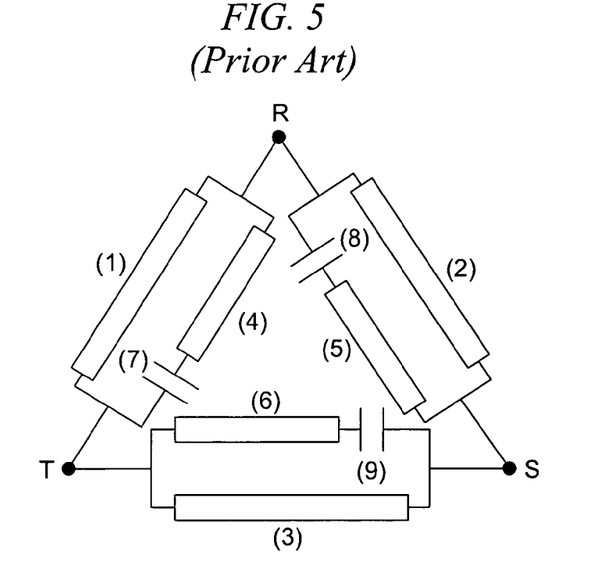
FIG. 5 depicts a modified known delta configuration of an electric motor.

FIG. 5 shows a three phase electric motor, an additional winding provided and fed through capacitors and parallel connected to the main winding. This figure illustrates a delta configuration. The three main windings are (1), (2), and (3), and the three additional windings are (4), (5), and (6). The additional winding capacitors are (7), (8), and (9), and the three phase line voltage connections are (R), (S), and (T).

Figure 6:
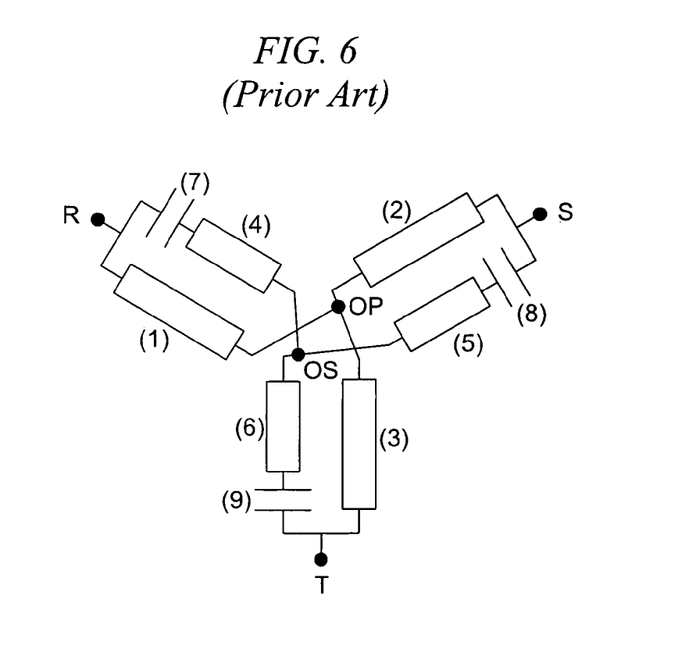
FIG. 6 shows a modified known star configuration of an electric motor.

FIG. 6 illustrates a star configuration, with the three main windings denoted (1), (2), and (3), and the three additional windings denoted (4), (5), and (6). The additional winding capacitors are denoted (7), (8), and (9), the three phases line voltage connections are denoted (R), (S), and (T), and the center point of the stars is denoted (OP) for the main winding and is denoted (OS) for the additional winding.

Figure 7:
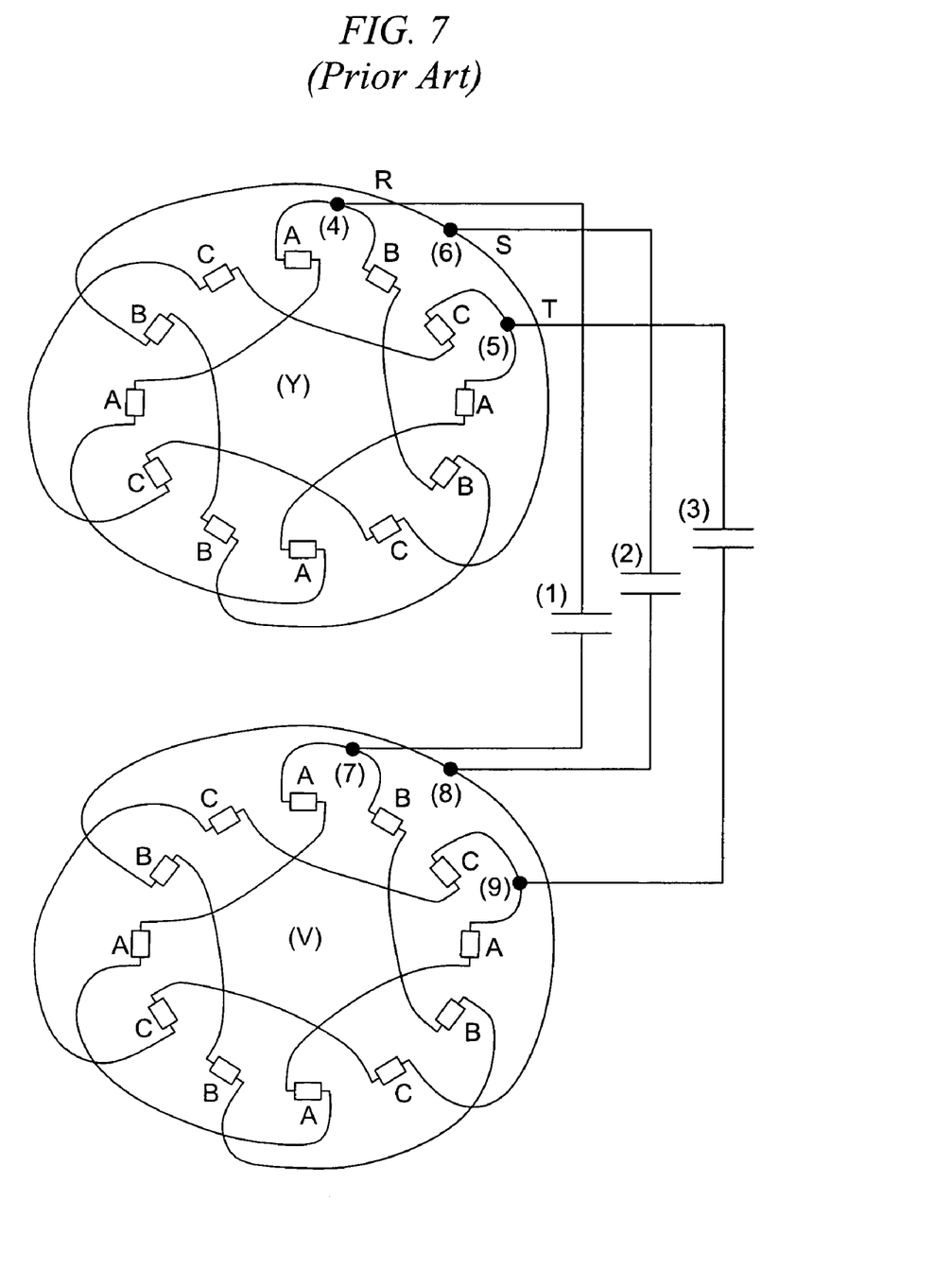
FIG. 7 shows known winding interval connections of electric motors.

FIG. 7 depicts winding interval connections and shows a four poles one delta adjacent poles, three phase winding and the internal connections of the main and additional windings.

The connection point for the in line (R) is marked (4) for the main winding and (7) for the additional winding. The in line (S) is marked (6) for the main winding and (8) for the additional winding. The in line (T) is marked (5) for the main winding and (9) for the additional winding. The additional winding capacitors are marked (1), (2), and (3). Observing the respective delta connection on each main and additional winding, there is a physical unbalanced pattern. Delta connection (6) is totally uneven in relation with delta connections (4) and (5).

Delta connection (8) is totally uneven in relation with delta connection (7) and (9). This physical unbalance affects phase angle slip between the two windings in relation to the rotation direction (clockwise or counterclockwise) of the rotor. This type of winding internal connection affects energy savings in one rotation direction.

Processing the above technology on a conventional three phase electric motor achieves the following:

Increase of overall copper density by about 15%;
Separation of the conventional winding into two separate windings following the ratio of 1/2.
Conversion of the conventional winding into a lap layout adjacent poles connected (Consequent poles type windings cannot be used);
Conversion of the conventional winding connections into a delta configuration respecting the original number of circuits;
Calculation of the additional winding capacitor rating in microfarads;

$$\text{Formula} \quad C = P \times \frac{(460)^2}{(E)^2} \times 1.5$$

C is the capacitance in microfarads per phase;
P is the electric motor theoretical rated horse power;
1.5 is a multiplying factor derived from the research experiments;
460 is a constant base voltage.

This formula does not accurately calculate the optimum capacitor value, because it does not take into consideration the actual field working under load parameters of the motor. So even though these prior art types of electric motors run at a better power factor with some energy savings, they can still be improved upon.

Figure 8A:
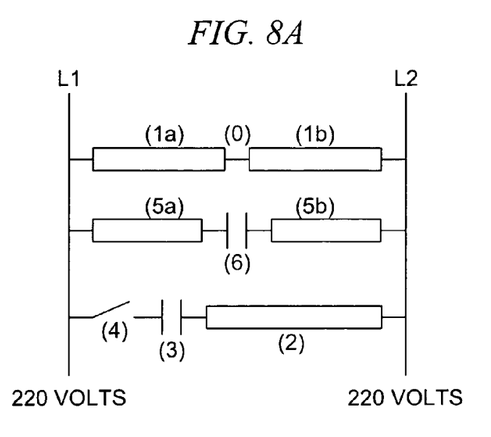
FIG. 8A depicts, according to the present invention, a single phase electric motor.
Figure 8B:
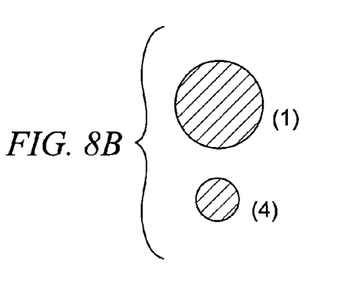
FIG. 8B depicts a primary and a secondary winding in cross section.

FIG. 8A depicts, according to the present invention, a single phase electric motor. The main winding is shown in two half sections (1a) and (1b) separated by a middle point (0). The additional winding also shows two half sections (5a) and (5b) connected electrically in series with capacitor (6). The start winding (2), the start capacitor (3), and the centrifugal switch or the disconnecting relay (4) are also shown. The single phase electric motor, according to the present invention, depicts an additional winding that is parallel connected with the main winding. Each of the half sections are in opposite field directions with each other and series connected at the center point to a capacitor. The center point of the main winding is used for dual voltage purpose. As mentioned above, the cross section of the conductor that forms the main winding is related to the cross section of the conductor that forms the additional winding by a ratio of about two-thirds (2/3) to one-third (1/3) as depicted in FIG. 8B. As drawn, the cross section of the conductor forming the main winding is on the top of said FIG. 8B and the cross section of the conductor forming the additional winding is on the bottom of said Fig. This 2/3 (main winding) to 1/3 (additional winding) ratio holds for all of the main windings and additional windings of the embodiments depicted in FIGS. 9–11 as well.

Figure 9:
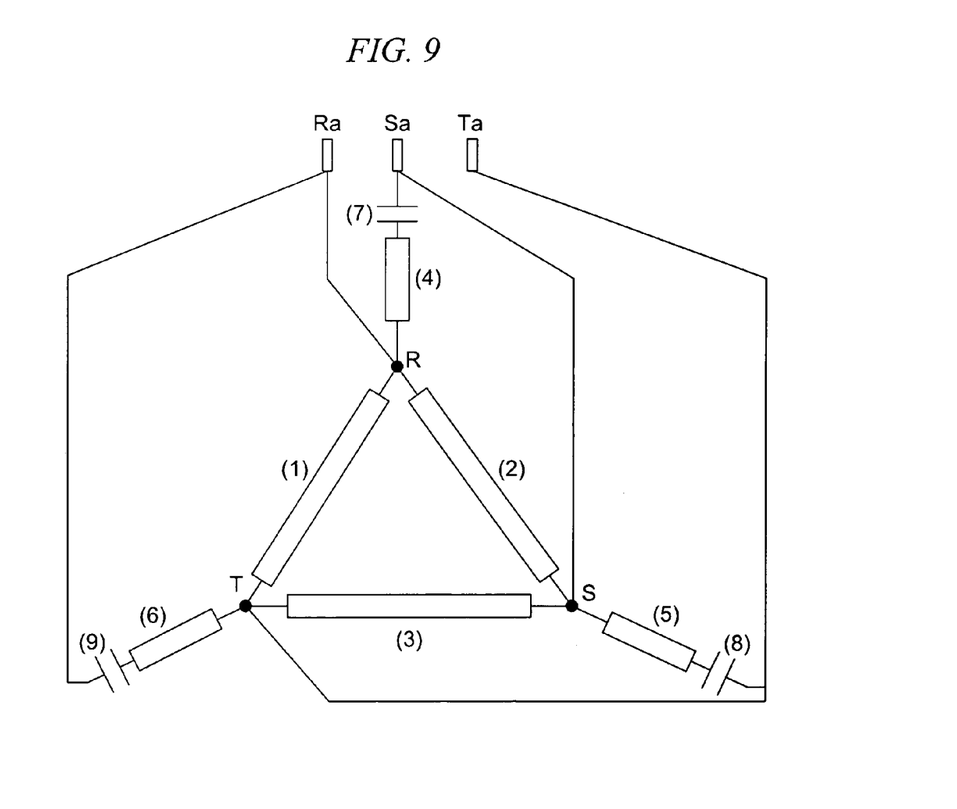
FIG. 9 shows, according to the present invention, a three phase electric motor on a delta configuration.

FIG. 9 shows a three phase electric motor, according to the present invention, connected in a delta configuration. The main windings are denoted (1), (2), and (3), the additional windings are denoted (4), (5), and (6), and the additional winding capacitors are denoted (7), (8), and (9). The delta connection points of the three main windings are (R), (S), and (T). The incoming line voltages connection points are (Ra), (Sa), and (Ta). Each additional winding is fed from a different phase than its respective main winding, and is reverse connected relative to its associated main winding so that the respective fields of the main and additional windings are opposed to one another. The value (capacitance) of the additional winding capacitor is predetermined.

Figure 10:
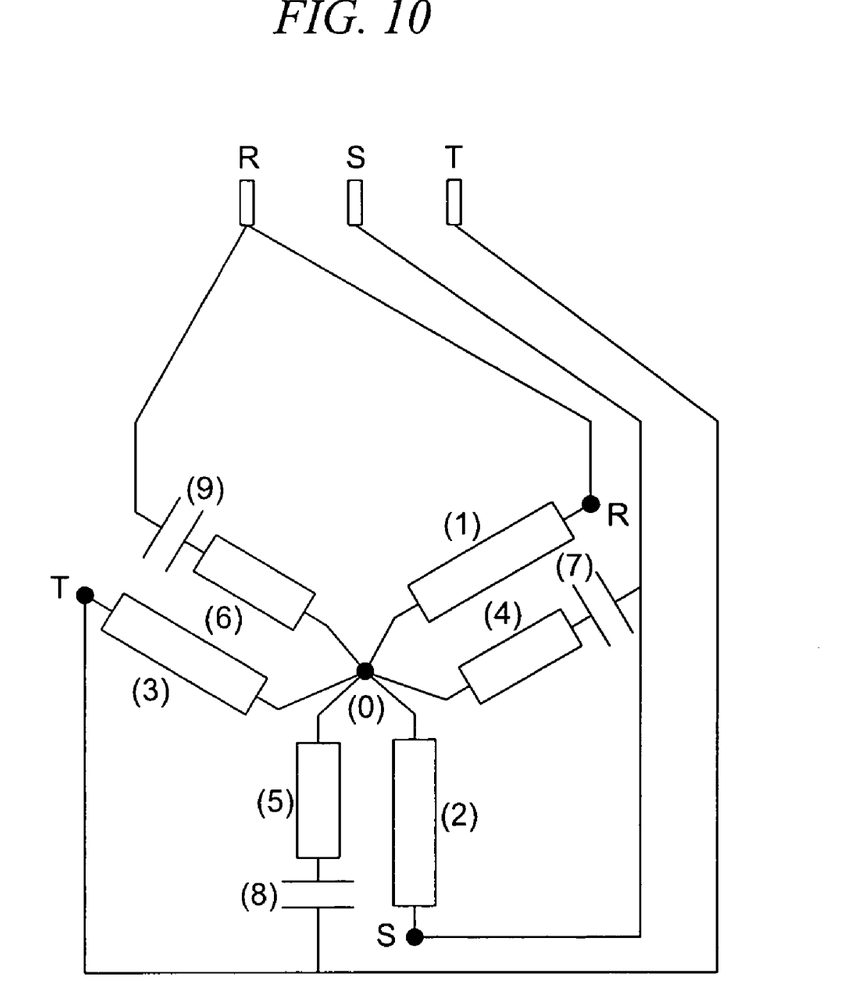
FIG. 10 shows, according to the present invention, on a star configuration a three phase electric motor.

FIG. 10 depicts a three phase electric motor, according to the present invention, in a star configuration. The three main windings (1), (2), and (3), the three additional windings (4), (5), and (6), and the additional winding capacitors (7), (8), and (9) with the star connection point (O), and the three line voltage connections (R), (S), and (T).

Each additional winding is fed with a different phase than its respective main winding. The de-saturation additional winding (4) of main winding (1) is connected through capacitor (7) to in line (S) of main winding (2). De-saturation additional winding (5) of main winding (2) is connected through capacitor (8) to in line (T) of main winding (3).

De-saturation additional winding (6) of main winding (3) is connected through capacitor (9) to in line (R) of main winding (1). This clearly shows the opposite field position of the different winding. There is a single star connection point.

Figure 11:
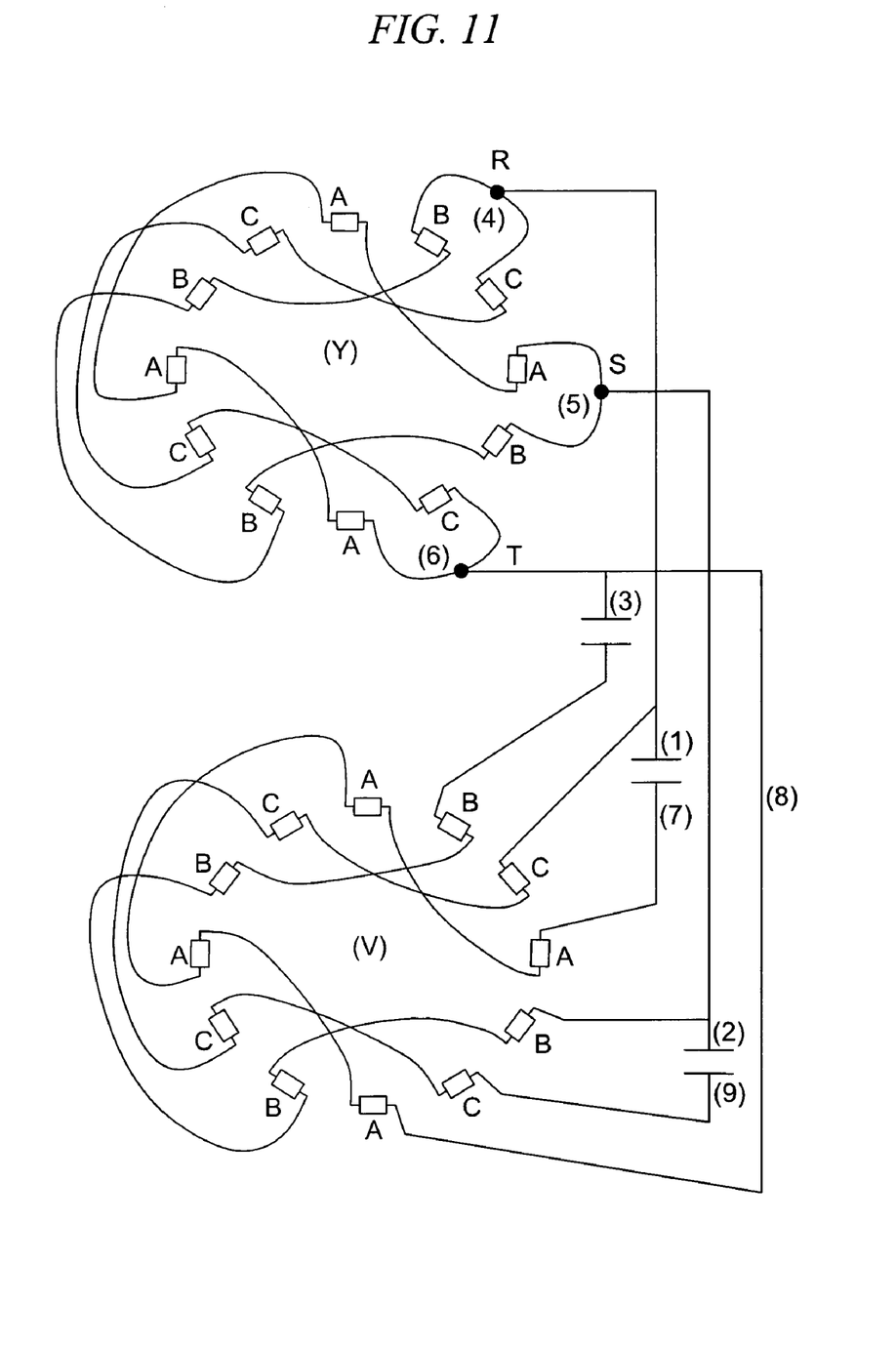
FIG. 11, according to the present invention, shows winding interval connections of a four poles on delta adjacent poles, three phase electric motor.

FIG. 11 illustrates winding internal connections of a four poles one delta adjacent poles, according to the present invention, for a three phase electric motor. The connection point for the in line (R) is point (4) for the main winding and point (7) for the additional winding. The connection point (6) is for the in line T, and the connector point (8) is for the additional winding. The additional winding capacitors are denoted (1), (2), and (3).

The respective delta connections of each main and additional windings are three delta points (4), (5), and (6) of the main winding which are perfectly symmetrical and equidistant from each other. This novel configuration corrects the efficiency and energy saving problem of the prior art in relation to the direction of rotation. This inventive solution provides a four poles one circuit delta, which corrects the rotational problem at other speeds and multiple numbers of circuits, in either a delta configuration or a star configuration.

Thus, to convert a known single phase or three phase electric motor, as defined in the present invention, the following advantages are noted:

No changes on the copper density;

Separation of the conventional winding in two different and separate winding following the approximate ration of 1/3, and 2/3;

No changes are required on the original type of winding layout, adjacent or consequent poles.

Both windings, according to the present invention, can be wound and inserted in a single step operation. It is feasible to calculate the capacitance of the additional winding capacitor in microfarads per phase. This value is directly proportional to the real full load current in amps per phase and inversely proportional of the square of the line voltage in volts. The value timing is then determined by a multiplying factor that is approximately between $0.250 \times 10^6$ and $0.3 \times 10^6$. The additional winding and the additional winding capacitor are connected to one another in series relation and are connected in parallel relation to the main winding. Moreover, the additional winding and the additional winding capacitor are reverse connected relative to the main winding and are not connected to the same phase voltage as the main winding. More particularly, in FIG. 9, main winding (1) is connected to voltage phase $R_A$, and auxiliary winding (4) is connected to voltage phase $S_A$ through capacitor (7); main winding (2) is connected to voltage phase $S_A$, and auxiliary winding (5) is connected to voltage phase $T_A$ through capacitor 8, and main winding (3) is connected to voltage phase $T_A$, and auxiliary winding (6) is connected to voltage phase $R_A$ through capacitor 9. The same construction applies to the star or "wye" configuration of FIG. 10, where the respective voltage phases are denoted R, S, and T.

It is, therefore, clearly advantageous according to the present invention, to increase the overall efficiency, a distinct improvement of the power factor, a noted considerable drop in the starting current, running current and in the full load current.

Each additional winding is fed through one or more capacitors so that current flowing through said additional windings has a different phase angle and an opposite field direction relative to the phase angle and field direction of the current flowing through the respective main windings and in which the total cross-section of the wire size used on each main and additional winding are of predetermined dimensions.

The calculation process of the winding capacitor value follows a specific formula in which the value in microfarads is directly proportional to the actual full load current in amperes consumed by the electric motor, or produced by the synchronous generator, inversely proportional to the square of the line voltage and directly proportional to a multiplying factor that is between about $0.25 \times 10^6$ and $0.3 \times 10^6$.

The novel single phase electric motor of this invention includes first and second main windings coupled to a main common point and first and second potential lines of a line voltage. It further includes first and second additional windings coupled to a winding capacitor. The first and second potential lines are electrically connected in a parallel connection with the first and second main windings. Each of the first and second additional windings generates a field in an opposite direction relative to a corresponding one of the first and second main windings.

The first and the second main windings have a first wire size and each of the first and the second additional windings has a second wire size. The first wire size is approximately twice the second wire size.

The novel multi-phase electric motor includes a plurality of main windings connected in delta configuration at three line connection points having a line voltage and each of the main winding has a first wire size. An additional winding and an additional winding capacitor are connected in series with one another and in parallel relation to each main winding, with the additional winding having a second wire size less than said first wire size and an angle different from and generating a field in opposite direction than its respective main winding.

What is claimed:

1. An alternating current electric motor, comprising:
   a main winding;
   an additional winding;
   a capacitor connected in series relation to said additional winding;
   said additional winding and said capacitor being connected in parallel relation to said main winding;
   said additional winding being reversely connected with respect to said main winding so that current flows in a first direction through said main winding and in a second direction in said additional winding, said second direction being opposite to said first direction;
   said main winding having a first field direction;
   said additional winding having a second field direction opposite to said first field direction;
   said current flowing through said main winding having a first phase angle;
   said current flowing through said additional winding having a phase angle different from said first phase angle; and said main winding formed of a conductor having a cross-sectional area greater than a cross-sectional area of a conductor that forms said additional winding.

2. The electric motor of claim 1, further comprising:
said capacitor having a capacitance directly proportional to a current drawn by said electric motor at full load and inversely proportional to the square of the line voltage supplied to said electric motor.

3. The electric motor of claim 2, further comprising:
said capacitor having a capacitance in microfarads determined by multiplying said current drawn by said electric motor at full load by a constant to obtain a result, and dividing that result by said square of said line voltage supplied to said electric motor.

4. The electric motor of claim 3, further comprising:
said constant being in a range from about $0.250 \times 10^6$ to $0.300 \times 10^6$.

5. The electric motor of claim 1 further comprising:
said cross-sectional area of said conductor that forms said main winding having a cross-sectional area that is greater than said cross-sectional area of said conductor that forms said additional winding by a predetermined ratio.

6. The electric motor of claim 5, further comprising:
said predetermined ratio being 2/3 to 1/3.

7. The electric motor of claim 1, further comprising:
said first conductor having a first length;
said second conductor having a second length; and
said first length being greater than said second length.

8. The electric motor of claim 7, further comprising:
said second length being about half the length of said first length.

9. A single phase electric motor, comprising:
first and second main windings each having a first end electrically connected to a common point and each having a second end electrically connected to first and second potential lines of a line voltage;
first and second additional windings connected in series to a winding capacitor and each having a second end electrically connected to said first and second potential lines of a line voltage;
said first and second additional windings and said winding capacitor being electrically connected to said first and second main windings in parallel and in reversely connected relation thereto so that the field generated by said first and second main windings is opposite to the field generated by said first and second additional windings;
said winding capacitor causing the respective phase angles of the current flowing through said first and second main windings to be different from the respective phase angles of the current flowing through said first and second additional windings;
said winding capacitor having a capacitance directly proportional to a current drawn by said electric motor at full load and inversely proportional to the square of the line voltage supplied to said electric motor.

10. The electric motor of claim 9, further comprising:
said capacitor having a capacitance in microfarads determined by multiplying said current drawn by said electric motor at full load by a constant to obtain a result, and dividing that result by said square of said line voltage supplied to said electric motor.

11. The electric motor of claim 10, further comprising:
said constant being in a range from about $0.250 \times 10^6$ to $0.300 \times 10^6$.

12. The electric motor of claim 9, further comprising:
said main winding formed of wire having a cross-sectional area greater than a cross-sectional area of wire that forms said additional winding.

13. The electric motor of claim 9, further comprising:
said cross-sectional area of said wire that forms said main wiring having a cross-sectional area that is greater than said cross-sectional area of said wire that forms said additional winding by a predetermined ratio.

14. The electric motor of claim 13, further comprising:
said predetermined ratio being 2/3 to 1/3.

15. The electric motor of claim 9, further comprising:
said first conductor having a first length;
said second conductor having a second length; and
said first length being greater than said second length.

16. The electric motor of claim 15, further comprising:
said second length being about half the length of said first length.

17. A multiphase electric motor, comprising:
a plurality of main windings connected in a delta configuration;
a plurality of additional windings, each of which is associated with a main winding of said plurality of main windings;
each additional winding of said plurality of additional windings being reversely connected with respect to each main winding of said plurality of main windings so that current flowing through each main winding flows in a direction opposite to the current flowing through each additional winding;
a capacitor connected in series relation to each additional winding of said plurality of additional windings so that each additional winding has a capacitor associated with it;
each additional winding and associated capacitor being connected in a delta configuration in parallel relation to said associated main winding of said plurality of main windings;
each main winding having a field direction opposite to a field direction of each additional winding; and
said current flowing through each of said additional windings and associated capacitor having a phase angle different from said current flowing through each of said main windings;
said capacitor having a capacitance directly proportional to a current drawn by said electric motor at full load and inversely proportional to the square of the line voltage supplied to said electric motor.

18. The electric motor of claim 17, further comprising:
said capacitor having a capacitance in microfarads determined by multiplying said current drawn by said electric motor at full load by a constant to obtain a result, and dividing that result by said square of said line voltage supplied to said electric motor.

19. The electric motor of claim 18, further comprising:
said constant being in a range from about $0.250 \times 10^6$ to $0.300 \times 10^6$.

20. The electric motor of claim 17, further comprising:
said main winding formed of wire having a cross-sectional area greater than a cross-sectional area of wire that forms said additional winding.

21. The electric motor of claim 20, further comprising:
said cross-sectional area of said wire that forms said main wiring having a cross-sectional area that is greater than said cross-sectional area of said wire that forms said additional winding by a predetermined ratio.

22. The electric motor of claim 21, further comprising:
said predetermined ratio being 2/3 to 1/3.

23. The electric motor of claim 17, further comprising:
said first conductor having a first length;
said second conductor having a second length; and
said first length being greater than said second length.

24. The electric motor of claim 23, further comprising:
said second length being about half the length of said first length.

25. A multiphase electric motor, comprising:
a plurality of main windings connected in a star configuration;
a plurality of additional windings, each of which is associated with a main winding of said plurality of main windings;
each additional winding of said plurality of additional windings being reversely connected with respect to each main winding of said plurality of main windings so that current flowing through each main winding flows in a direction opposite to the current flowing through each additional winding;
a capacitor connected in series relation to each additional winding of said plurality of additional windings so that each additional winding has a capacitor associated with it;
each additional winding and associated capacitor being connected in a star configuration in parallel relation to said associated main winding of said plurality of main windings;
each main winding having a field direction opposite to a field direction of each additional winding;
said current flowing through each of said additional windings and associated capacitor having a phase angle different from said current flowing through each of said main windings; and
said main winding formed of a conductor having a cross-sectional area greater than a cross-sectional area of a conductor that forms said additional winding.

26. The electric motor of claim 25, further comprising:
said capacitor having a capacitance directly proportional to a current drawn by said electric motor at full load and inversely proportional to the square of the line voltage supplied to said electric motor.

27. The electric motor of claim 26, further comprising:
said capacitor having a capacitance in microfarads determined by multiplying said current drawn by said electric motor at full load by a constant to obtain a result, and dividing that result by said square of said line voltage supplied to said electric motor.

28. The electric motor of claim 27, further comprising:
said constant being in a range from about $0.250 \times 10^6$ to $0.300 \times 10^6$.

29. The electric motor of claim 25, further comprising:
said cross-sectional area of said conductor that forms said main wiring having a cross-sectional area that is greater than said cross-sectional area of said conductor that forms said additional winding by a predetermined ratio.

30. The electric motor of claim 29, further comprising:
said predetermined ratio being 2/3 to 1/3.

31. The electric motor of claim 25, further comprising:
said first conductor having a first length;
said second conductor having a second length; and
said first length being greater than said second length.

32. The electric motor of claim 30, further comprising:
said second length being about half the length of said first length.

* * * * *